US006141998A

United States Patent [19]

Seo

[11] Patent Number: 6,141,998

[45] Date of Patent: Nov. 7, 2000

[54] DOOR LOCK DEVICE

[76] Inventor: Jung-Yoon Seo, 11-703 Woosung Apartmant 340 Songnae-dong, Sosa-ku, Puchon-Si, Kyungki-do, Rep. of Korea

[21] Appl. No.: 09/216,634

[22] Filed: Dec. 16, 1998

[30] Foreign Application Priority Data

Jan. 15, 1998 [KR] Rep. of Korea .......................... 98-999

[51] Int. Cl.[7] .................................................... B60R 25/02

[52] U.S. Cl. ............................ 70/224; 70/472; 292/336.3

[58] Field of Search .............................. 70/149, 223, 224, 70/422, 472, 479–481, 467, 468; 292/336.3

[56] References Cited

U.S. PATENT DOCUMENTS

| | | | |
|---|---|---|---|
| 2,449,711 | 9/1948 | Milligan | 70/472 X |
| 2,634,598 | 4/1953 | Kaiser | 70/472 |
| 2,662,387 | 12/1953 | Hagstrom | 70/472 |
| 4,428,212 | 1/1984 | Best et al. | 70/224 |
| 5,036,575 | 8/1991 | Campion et al. | 70/224 X |
| 5,544,507 | 8/1996 | Lin | 70/224 X |
| 5,685,583 | 11/1997 | Meck et al. | 70/224 X |
| 5,732,580 | 3/1998 | Garnault et al. | 70/422 |
| 5,784,909 | 7/1998 | Huang | 70/224 |
| 5,809,815 | 9/1998 | Lee | 70/223 X |
| 5,816,086 | 10/1998 | Russell, IV | 70/223 X |
| 5,904,232 | 5/1999 | Shen | 70/224 X |
| 5,934,117 | 8/1999 | Shen | 70/224 |

*Primary Examiner*—Suzanne Dino Barrett

*Attorney, Agent, or Firm*—Skjerven, Morrill, MacPherson, Franklin & Friel LLP; Alan H. MacPherson; Hugh H. Matsubayashi

[57] ABSTRACT

A door lock device having an indoor and outdoor housing, each having inner tube-shaped supports, and further including indoor and outdoor handle connection members, each having at a first end handle connections with an indoor and an outdoor handle, respectively, and having at a second end opposite the first end driving cams formed with a cam curvature having step differences in an axial direction. Indoor and outdoor slide cylinders are provided having driven cams in contact with the driving cams and experiencing a rectilinear motion in the axial direction by means of the axial step difference. A first coupling spring is fixed to the indoor handle connection member and the indoor slide cylinder. A second coupling spring is fixed to the outdoor handle connection member and the outdoor slide cylinder. Indoor and outdoor end frames allow the indoor and outdoor slide cylinders to be guided rectilinearly in the axial direction by means of a rectilinear guide fitting. A guide frame located between the indoor and outdoor end frames includes an operating piece supported by a door lock spring, the operating piece being connected to the door lock unit. Indoor and outdoor rotary pieces are positioned to experience a rotational motion with the indoor and outdoor end frames by means of first and second pins, and having a sliding rotational motion by means of the indoor and outdoor slide cylinders.

5 Claims, 12 Drawing Sheets

DOOR LOCK DEVICE

BACKGROUND OF THE INVENTION

1. Field of the Invention

The present invention relates to a door lock device and, more particularly, to a door lock device which is adapted to easily unlock the door by bringing indoor and outdoor handles in the turning, back and forth sliding, or twisting motion in any direction by means of cross-section cams.

2. Description of the Related Art

FIG. 1 shows a general door lock device. As shown in FIG. 1, the door lock device is provided with indoor knob 10 and outdoor knob 11 which are specially made for holding inside or outside a door 12 and located on both side surfaces of the door 12, wherein the indoor and outdoor knobs 10 and 11 are intended to be turned in one direction for making a door lock unit 5 move back and forth in such a manner that the door 12 is unlocked.

Furthermore, a door lock button 13 is provided in the center of the end of the indoor knob 10 so that the outdoor knob 11 is intended not to be turned for the purpose of preventing somebody's entrance into the interior of a room through the door. In order to release the door lock button 13 and thereby unlock the door, the user has to turn the indoor knob 10 in the one direction, or to insert a key 15 into a key cylinder 14 which is positioned in the center of the end of the outdoor knob 11 and then turn it in the key cylinder 14.

However, such a conventional door lock device as described above is so constructed that it is operated simply by the turning or sliding motions of the indoor and outdoor knobs 10 and 11, and accordingly, it is hard to operate accurately not only for normal persons but also for persons who have difficulty in moving their bodies or have a disability of the body, such as the old and the weak including children, pregnant women, physically handicapped persons and patients.

SUMMARY OF THE INVENTION

Therefore, an objective of the present invention is to provide a door lock device which is adapted to easily unlock the door by bringing indoor and outdoor handles in the turning, back and forth sliding, or twisting motion in any direction.

In accordance with the present invention, in a door lock device which has an indoor handle and an outdoor handle which are installed inside and outside a room, respectively, a door lock button positioned on the indoor handle for switching the locking state of a door; an unlocking button positioned on the outdoor handle for releasing the locking state of the door lock button, and a door lock unit located on the door for being snapped in a snap piece which is disposed on a doorframe, the door lock device includes: an indoor housing and an outdoor housing each having inner tube-shaped supports; an indoor handle connection member and an outdoor handle connection member each having handle connections provided on a first end thereof in communication with the indoor and outdoor handles through the indoor and outdoor housings, respectively, and driving cams provided on a second end thereof formed with a cam curvature having step differences in the axial direction; an indoor slide cylinder and an outdoor slide cylinder each having driven cams provided on a first end thereof in contact with the driving cams, and experiencing a rectilinear motion in the axial direction by means of an axial step difference formed according to the movement of the indoor and outdoor handle connection members; a first closely coupling spring having a first end fixed to the indoor handle connection member, and a second end fixed to the indoor slide cylinder; a second closely coupled spring having a first end fixed to the outdoor handle connection member, and a second end fixed to the outdoor slide cylinder; an indoor end frame and an outdoor end frame for allowing the indoor and outdoor slide cylinders, respectively, to be guided rectilinearly in the axial direction by means of a rectilinear guide fitting, and simultaneously being in communication with the indoor and outdoor housings, respectively; a guide frame located between the indoor and outdoor end frames and having an operating piece supported by a door lock spring, wherein the operating piece is connected to the door lock unit; and an indoor rotary piece and an outdoor rotary piece positioned to experience a rotational motion with the indoor and outdoor end frames by means of first and second pins, respectively, and having a sliding rotational motion by means of the indoor and outdoor slide cylinders for transferring the motion thereof to the operating piece.

DETAILED DESCRIPTION OF THE PREFERRED EMBODIMENT

Hereinafter, the present invention will be described by way of illustrative examples in detail.

Figure 1:
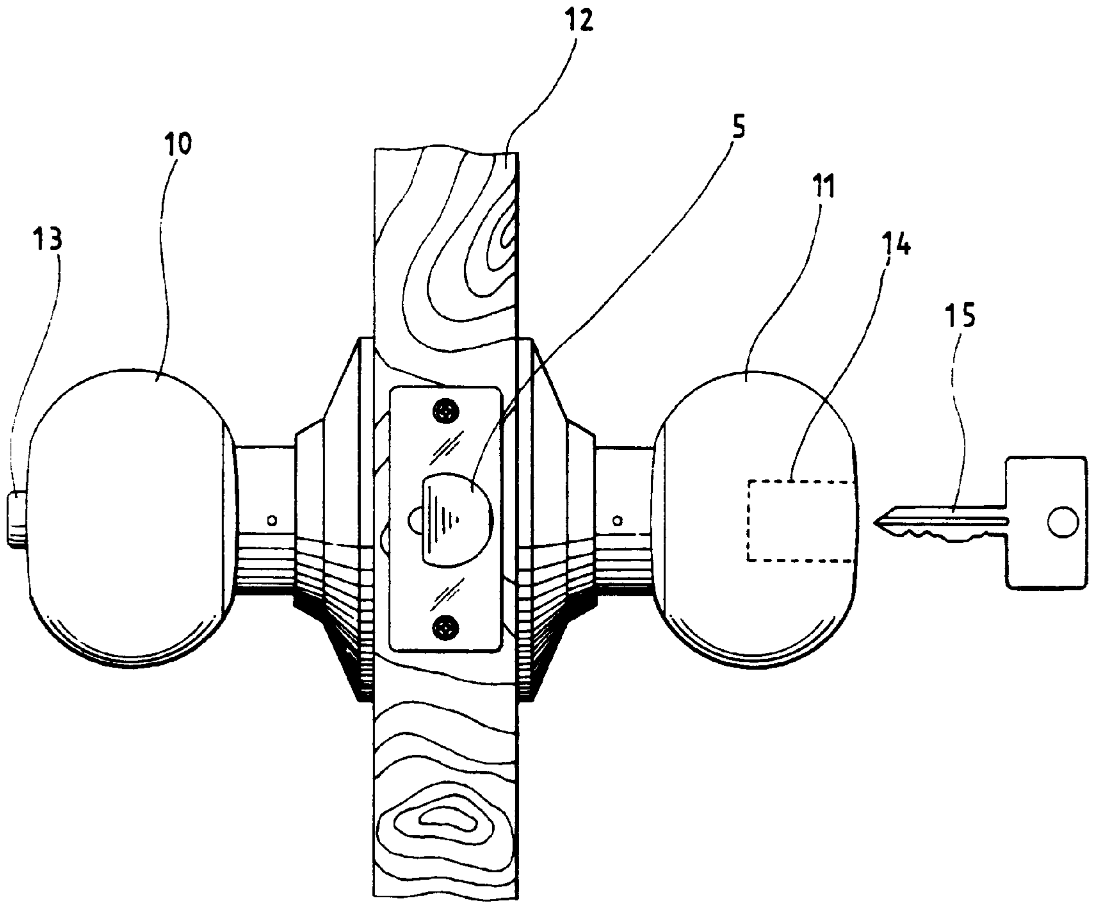
FIG. 1 is a side view of a general door lock device.
Figure 2:
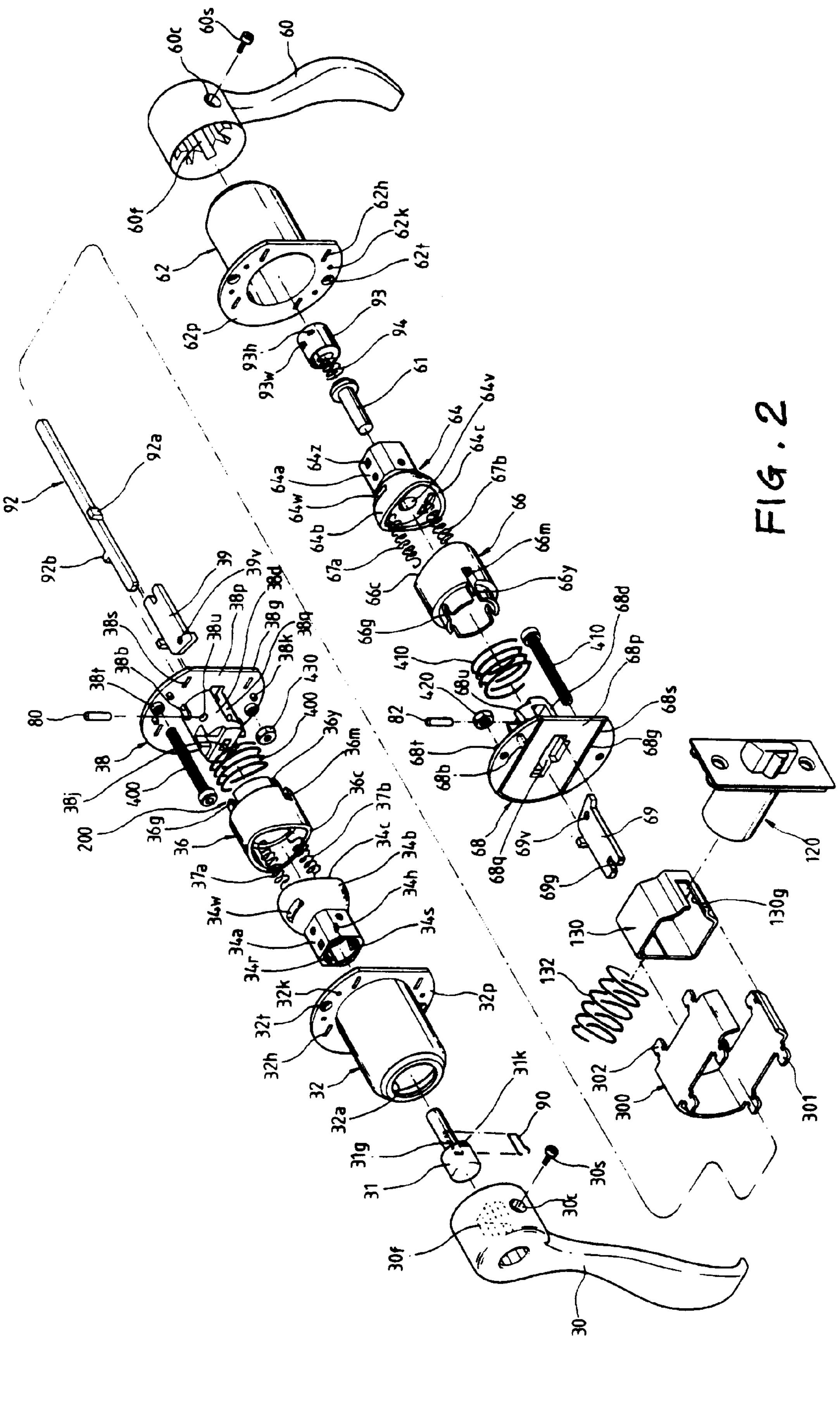
FIG. 2 is an exploded perspective illustrating the construction of a door lock device in accordance with the present invention.
Figure 3:
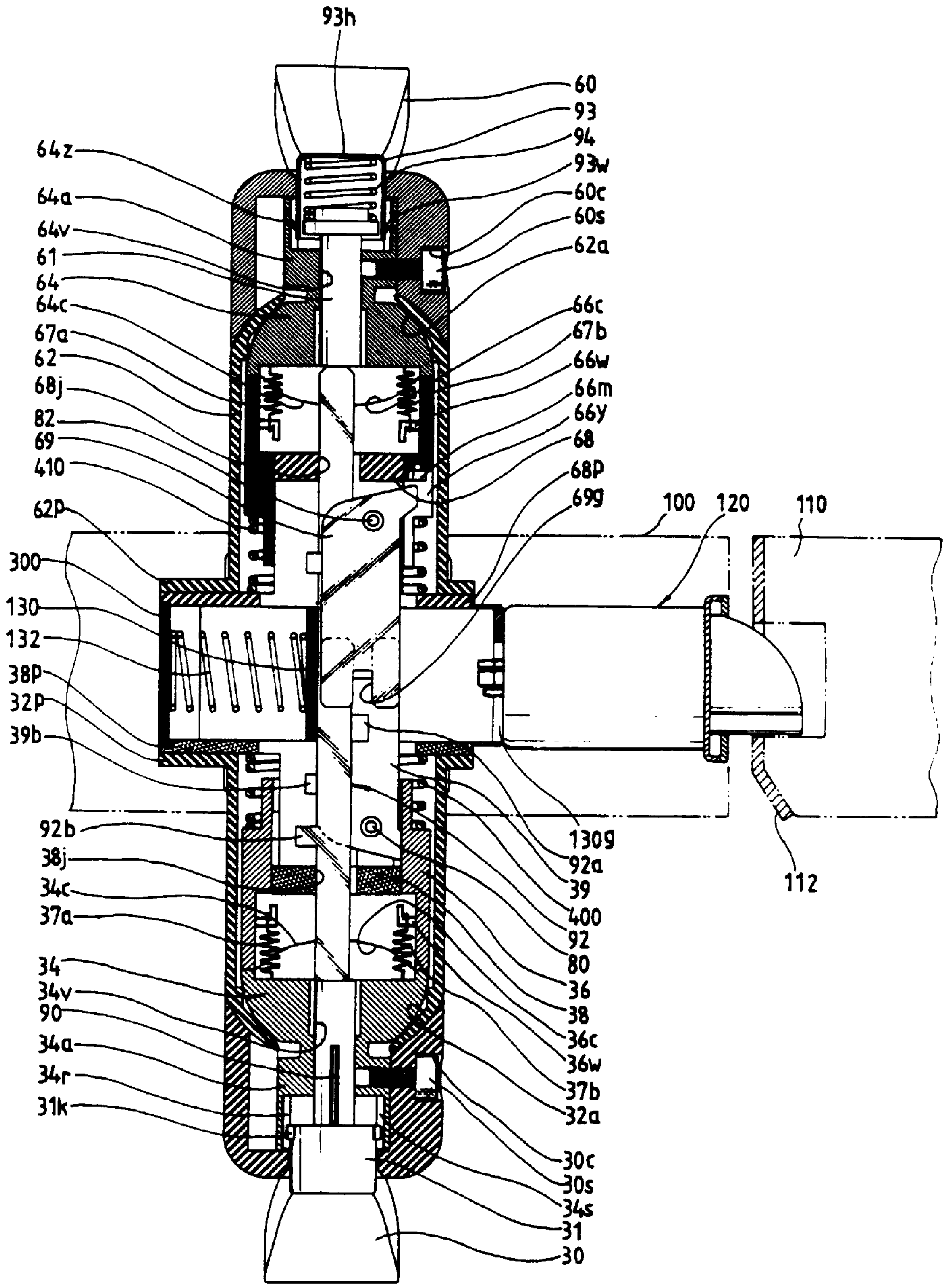
FIG. 3 is a cross-sectional view illustrating the construction of the door lock device in accordance with the present invention.
Figure 4:
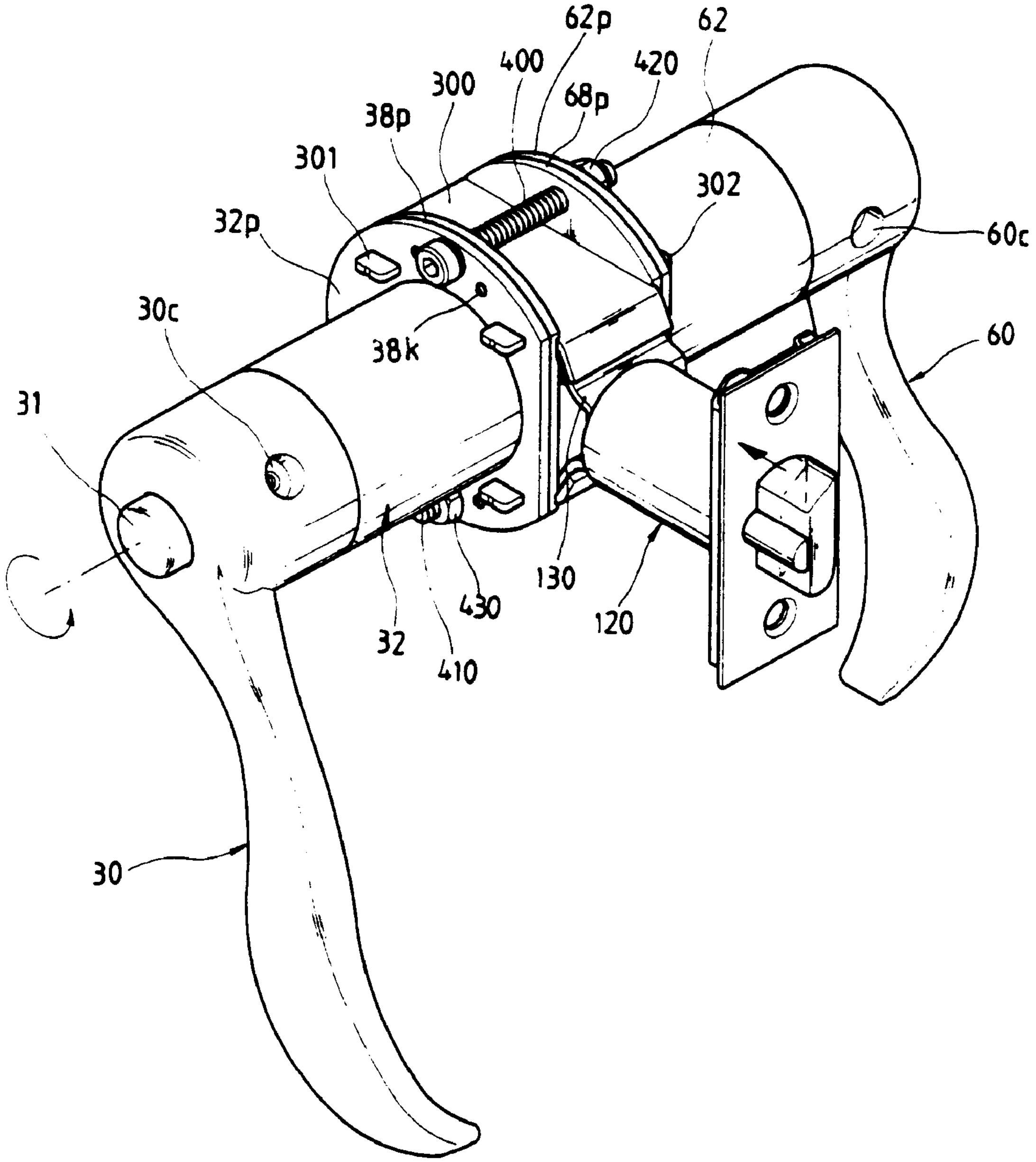
FIG. 4 is a perspective view illustrating the turning operation of the handle in the door lock device in accordance with the present invention.
Figure 5:
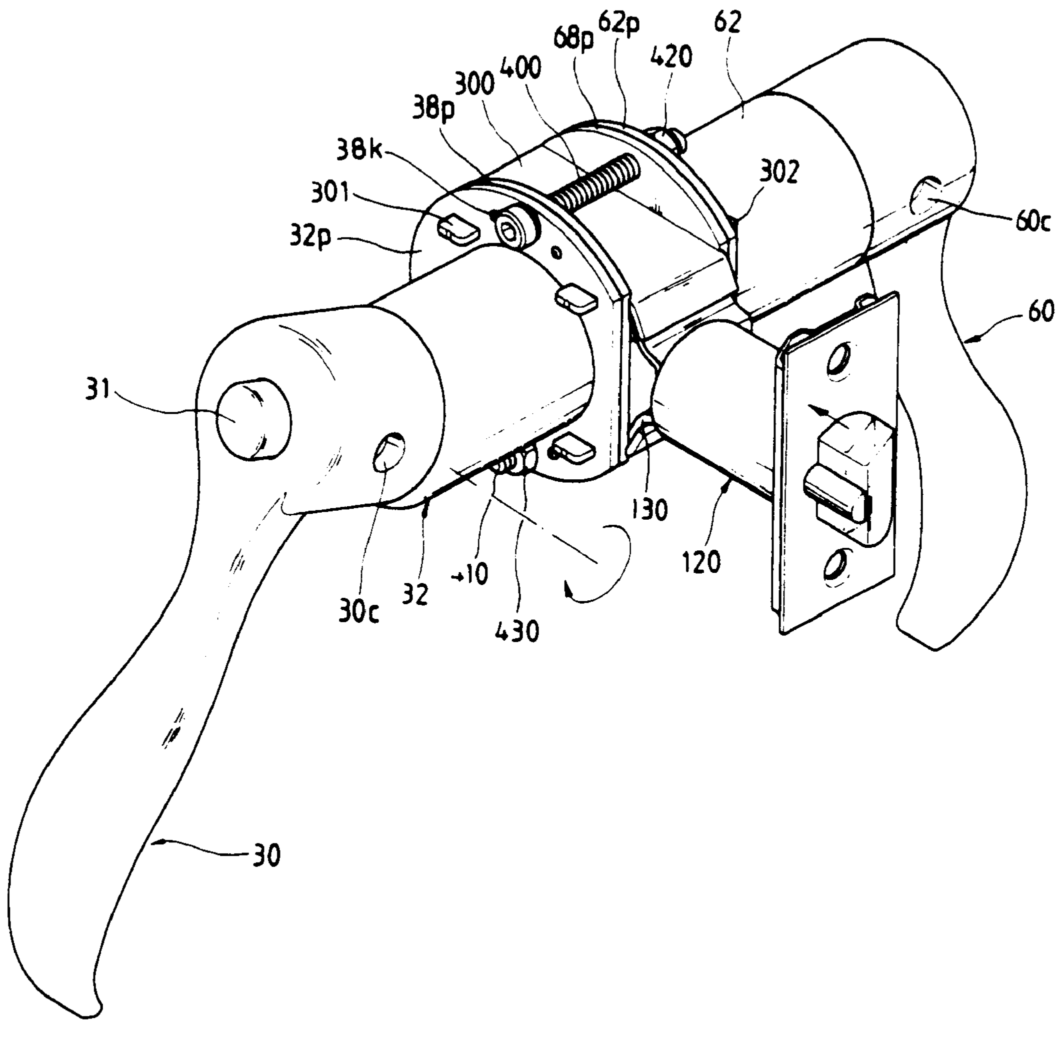
FIG. 5 is a perspective view illustrating the back and forth sliding operation of the handle in the door lock device in accordance with the present invention.
Figure 6:
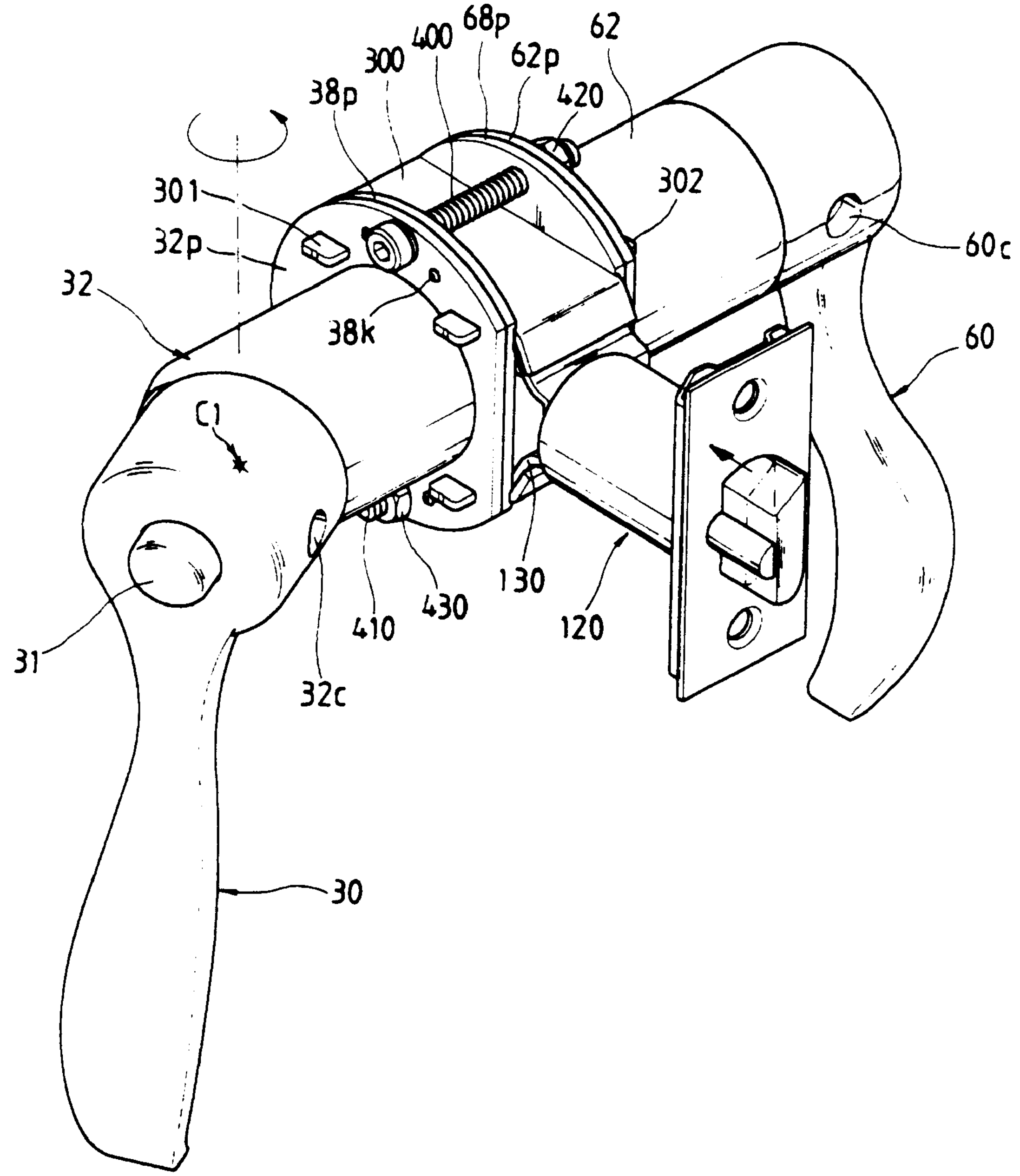
FIG. 6 is a perspective view illustrating the twisting operation of the handle in the door lock device in accordance with the present invention.
Figure 7:
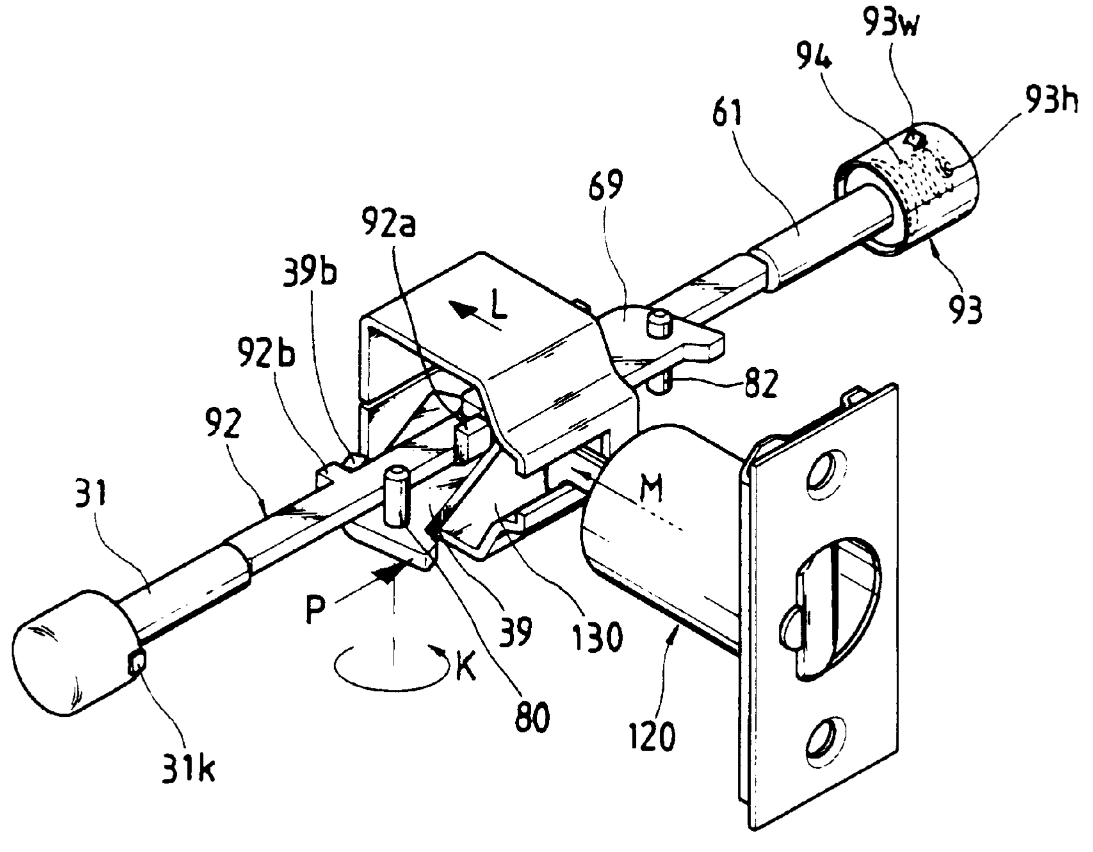
FIG. 7 is a perspective view of the principal parts illustrating the operation of the door lock device in accordance with the present invention.
Figure 8:
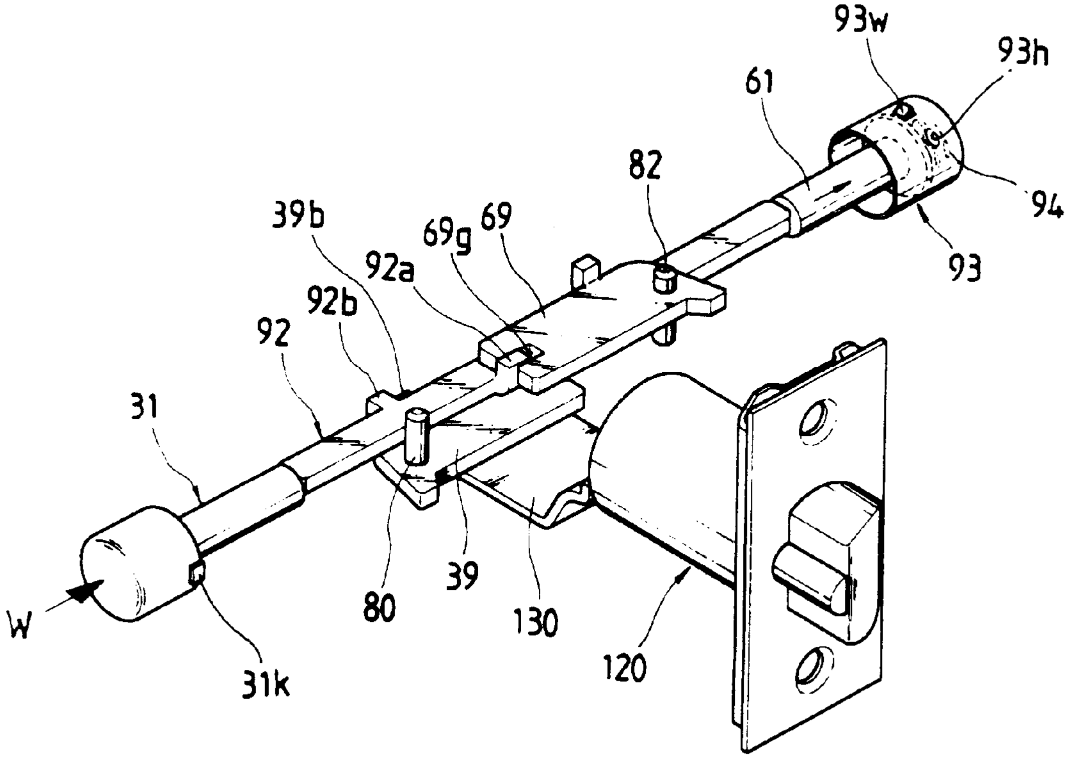
FIG. 8 is a perspective view of the principal parts illustrating the operation of the door lock button in the door lock device in accordance with the present invention.
Figure 9:
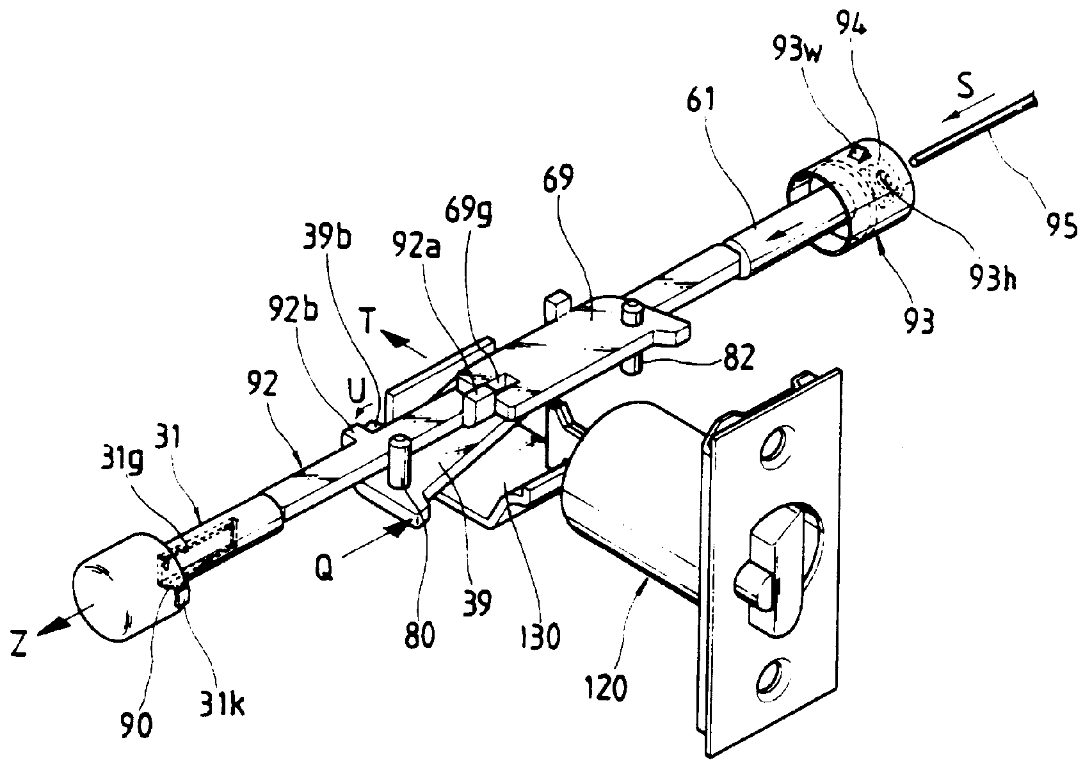
FIG. 9 is a perspective view of the principal parts illustrating the unlocking operation of the door lock button in the door lock device in accordance with the present invention.
Figure 10:
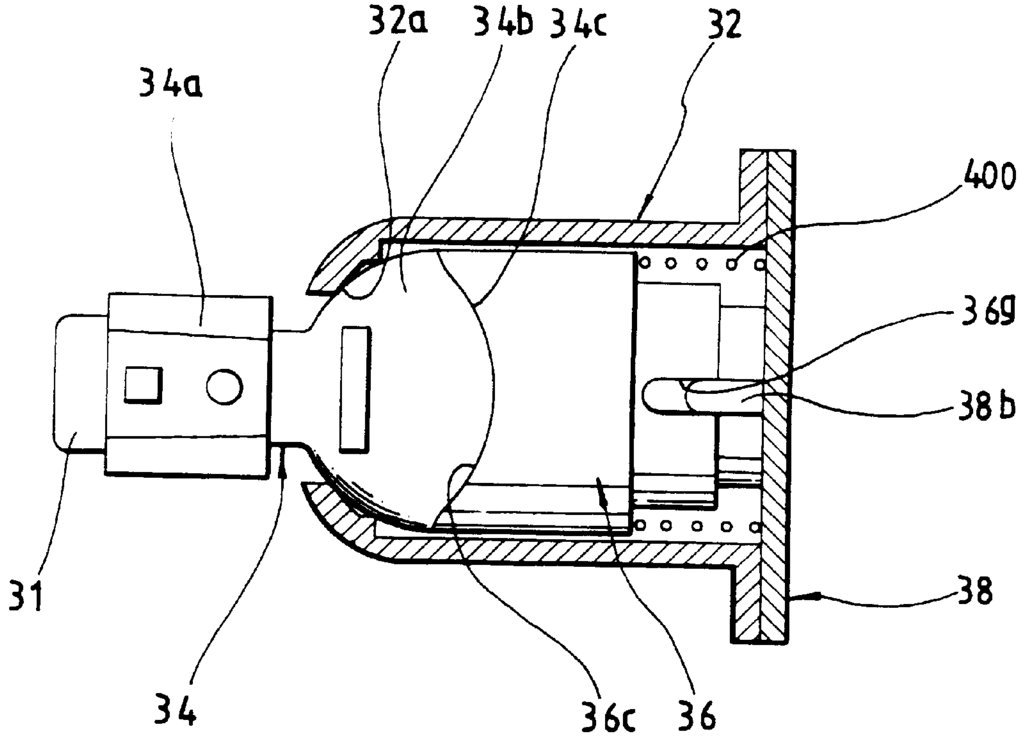
FIG. 10 is a cross-sectional view illustrating the state in which on operational force is imposed upon the indoor and outdoor handle connection members in the door lock device in accordance with the present invention.
Figure 11:
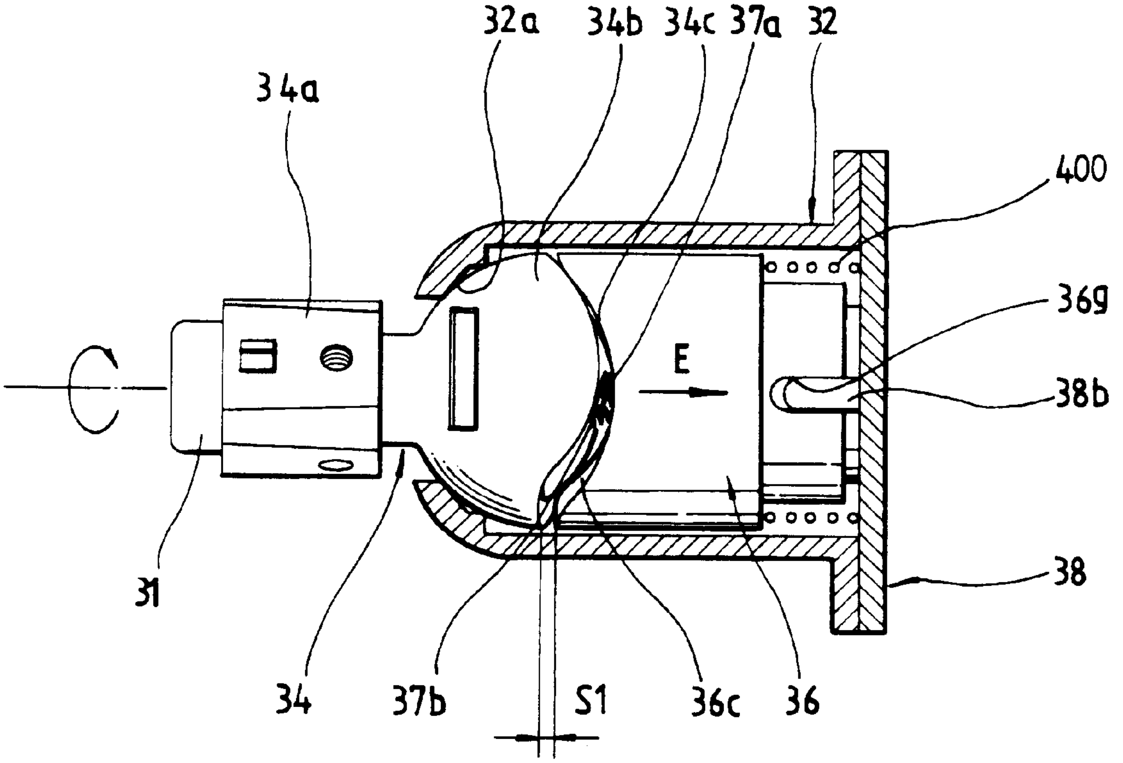
FIG. 11 is a cross-sectional view illustrating the state in which the turning operation is performed upon the indoor and outdoor handle connection members in the door lock device in accordance with the present invention.
Figure 12:
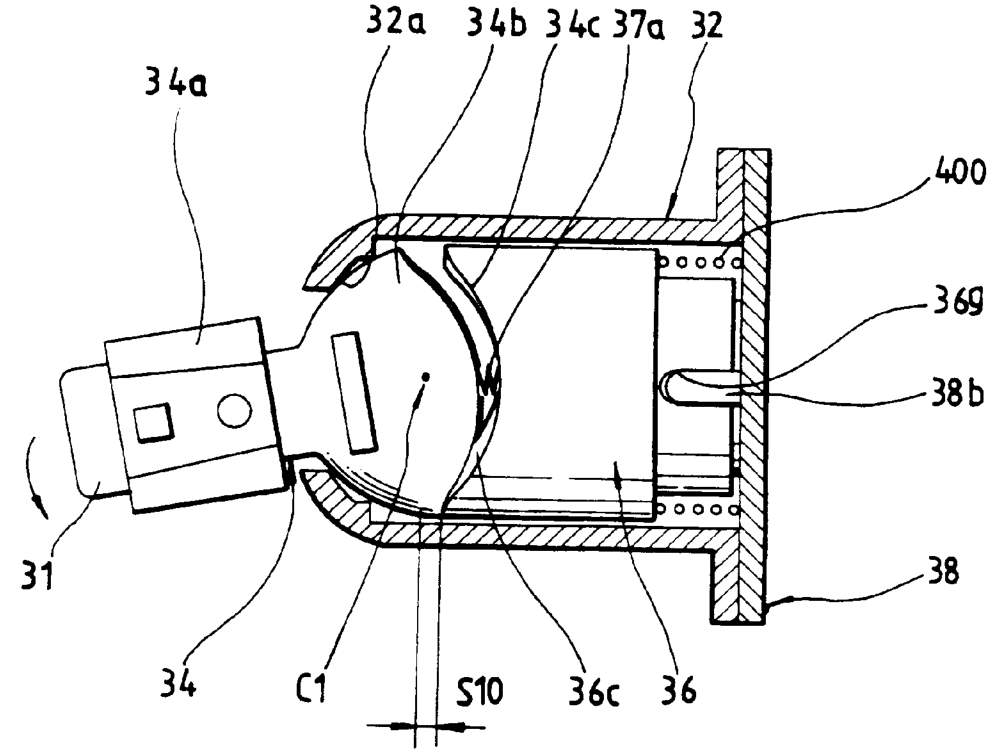
FIG. 12 is a cross-sectional view illustrating the state in which the twisting or back and forth sliding operation is performed upon the indoor and outdoor handle connection members in the door lock device in accordance with the present invention.

FIG. 1 is a side view of a general door lock device, and FIG. 2 is an exploded perspective illustrating the construction of a door lock device in accordance with the present invention. FIG. 3 is a cross-sectional view illustrating the construction of the door lock device in accordance with the present invention. FIG. 4 is a perspective view illustrating the turning operation of the handle in the door lock device in accordance with the present invention. FIG. 5 is a perspective view illustrating the back and forth sliding operation of the handle in the door lock device in accordance with the present invention. FIG. 6 is a perspective view illustrating the twisting operation of the handle in the door lock device in accordance with the present invention. FIG. 7 is a perspective view of the principal parts illustrating the operation of the door lock device in accordance with the present invention. FIG. 8 is a perspective view of the principal parts illustrating the operation of the door lock button in the door lock device in accordance with the present invention. FIG. 9 is a perspective view of the principal parts illustrating the unlocking operation of the door lock button in the door lock device in accordance with the present invention. FIG. 10 is a cross-sectional view illustrating the state in which no operational force is imposed upon the indoor and outdoor handle connection members in the door lock device in accordance with the present invention. FIG. 11 is a cross-sectional view illustrating the state in which the turning operation is performed upon the indoor and outdoor handle connection members in the door lock device in accordance with the present invention. FIG. 12 is a cross-sectional view illustrating the state in which the twisting or back and forth sliding operation is performed upon the indoor and outdoor handle connection members in the door lock device in accordance with the present invention.

As illustrated in the figures, in a door lock device which comprises an indoor handle 30 and an outdoor handle 60 which are installed inside and outside a room, respectively, a door lock button 31 positioned on the indoor handle 30 for switching the locking state of a door 100; an unlocking button 61 positioned on the outdoor handle 60 for releasing the locking state of the door lock button 31, and a door lock unit 120 located on the door 100 for being snapped in a snap piece 112 which is disposed on a doorframe 110, the door lock device comprises: an indoor housing 32 and an outdoor housing 62 having inner tube-shaped supports 32*a* and 62*a,* respectively; an indoor handle connection member 34 and an outdoor handle connection member 64 each having handle connections 34*a* and 64*a* provided on the one end thereof in communication with the indoor and outdoor handles 30 and 60 through the indoor and outdoor housings 32 and 62, respectively, and driving cams 34*c* and 64*c* provided on the other end thereof formed with a cam curvature having step differences in the axial direction; an indoor slide cylinder 36 and an outdoor slide cylinder 66 each having driven cams 36*c* and 66*c* provided on the one end thereof in contact with the driving cams 34*c* and 64*c,* and being in a rectilinear motion in the axial direction by means of an axial step difference S1 formed according to the movement of the indoor and outdoor handle connection members 34 and 64; closely coupling springs 37*a,* 37*b,* 67*a* and 67*b* each having both ends thereof being fixed to the indoor and outdoor handle connection members 34 and 36, the outdoor handle connection member 64, and the outdoor slide cylinder 66 in such a manner that the indoor and outdoor handle connection members 34 and 36 get in close contact with each other and the outdoor handle connection member 64 gets in close contact with the outdoor slide cylinder 66; an indoor end frame 38 and an outdoor end frame 68 for allowing the indoor and outdoor slide cylinders 36 and 66, respectively, to be guided rectilinearly in the axial direction by means of a rectilinear guide fitting 200, and simultaneously being in communication with the indoor and outdoor housings 32 and 62, respectively; a guide frame 300 located between the indoor and outdoor end frames 38 and 68 and having an operating piece 130 supported by a door lock spring 132, wherein the operating piece 130 is connected to the door lock unit 120; and an indoor rotary piece 39 and an outdoor rotary piece 69 positioned to be in a rotational motion with the indoor and outdoor end frames 38 and 68 by means of first and second pins 80 and 82, respectively, and having a sliding rotational motion by means of the indoor and outdoor slide cylinders 36 and 66 for transferring the motion thereof to the operating piece 130.

Also, the door lock device further comprises: a snap spring 90 provided on the door lock button 31 inserted into the indoor handle connection member 34 through the indoor handle 30, snapped in a snap-in hole 34*h* formed on the indoor handle connection member 34 while the door 100 is locked, and released from the snap-in hole 34*h* during unlocking the door 100; a door lock bar 92 being in a sliding motion in the axial direction by means of the door lock button 31, and having both locking and unlocking snap-in flanges 92*a* and 92*b;* an unlocking button 61 for compressing a return spring 94 built inside a cap 93 installed on the outdoor handle connection member 64 while it is pressed by the door lock bar 92, and being pressed by an unlocking pin 95 inserted thereinto through a central hole 93*h* formed in the cap 93 in such a manner that the locking flange 92*a* formed on the door lock bar 92 is released from a snap-in groove 69*g* formed in the outdoor rotary piece 69; and an unlocking cramp 39*b* formed in the indoor rotary piece 39, and hooked in the releasing flange 92*b* formed in the door lock bar 92 by means of the rotational motion of the indoor rotary piece 39 in such a manner that the door lock bar 92 is slidingly pressed to unlock the door 100.

Further, the door lock device further comprises prepressing springs 400 and 410 which are installed between the indoor slide cylinder 36 and the indoor end frame 38 and between the outdoor slide cylinder 66 and the outdoor end frame 68, respectively, thereby imposing elastic force upon the indoor slide cylinder 36, the indoor end frame 38, the outdoor slide cylinder 66 and the outdoor end frame 68 by means of the inner tube-shaped supports 32*a* and 62*a* formed in the indoor and outdoor housings 32 and 62.

In the door lock device, the rectilinear guide fitting 200 comprises: guide grooves 36*g* and 66*g* formed in the end portions of the indoor and outdoor slide cylinders 36 and 66, respectively; and guide ribs 38*b* and 68*b* formed in the indoor and outdoor end frames 38 and 68 and inserted into the guide grooves 36*g* and 66*g,* respectively.

Additionally, in the door lock device, the shapes of the driving cams 34*c* and 64*c,* and the driven cams 36*c* and 66*c* which get in contact with the driving cams 34*c* and 64*c* are not specifically limited to the sine wave and may be the triangular form.

The handle connections 34*a* and 64*a* have the four-cornered circumference, and the indoor and outdoor handles 30 and 60 have four-cornered holes so as for the handle connections 34*a* and 64*a* to be inserted thereinto. Further, counter screw holes 30*c* and 60*c* are formed on the side walls of the indoor and outdoor handles 30 and 60 so that set screws 30*s* and 60*s* pass through the counter screw holes 30*c* and 60*c*.

The door lock button 31 has a long groove 31*g* formed in the axial direction for the snap spring 90 to be inserted thereinto, and a guide flange 31*k* formed in the circumference of the door lock button 31 in such a manner that the snap spring 90 is in conformity with the snap-in hole 34*h* which is formed in the handle connection 34*a*. The handle connection 34*a* is provided with guide grooves 34*r* and 34*s* for guiding the guide flange 31*k*.

For the connections between the guide frame 300, the indoor end frame 38 and the outdoor end frame 68, and between the indoor housing 32 and the outdoor housing 62, the guide frame 300 is first bent in the U-character shape by means of a flat panel, with position determining pieces 301 and 302 projecting from the both ends of the guide frame 300. Then, U-shaped grooves 38*g* and 68*g* for the guide frame 300 inserted thereinto are formed in the respective ends of flanges 38*p* and 68*p* which are provided on the indoor and outdoor end frame 38 and 68, and they have slit-shaped position determining holes 38*s* and 68*s* so as for the position determining pieces 301 and 302 to be inserted thereinto. On the other hand, the flanges 32*p* and 62*p* formed in the indoor and outdoor housings 32 and 62 also have slit-shaped position determining holes 32*h* and 62*h* so that the position determining pieces 301 and 302 can be inserted into the position determining holes 32*h* and 62*h* and accordingly they are intended not to be out of place in the direction perpendicular to the axis. In order to prevent the position determining pieces 301 and 302 from being out of the place in the axial direction, they are provided with bosses 38*t* and 68*t* with screw holes projecting from the other side walls of the flanges 38*p* and 68*p* of the indoor and outdoor end frames 38 and 68, and the bosses 38*t* and 68*t* are fastened in engagement with bolts 400 and 410 and nuts 420 and 430.

Furthermore, a position determining pin 38*k* projects from the other sides of the flanges 38*p* and 68*p* on the indoor and outdoor end frames 38 and 68, with position determining holes 32*t*, 32*k*, 62*t* and 62*k* formed in the flanges 32*p* and 62*p* on the indoor and outdoor housings 32 and 62, so that the position determining pin 38*k* is inserted into the position determining holes 32*t*, 32*k*, 62*t* and 62*k*. Therefore, it is possible to prevent the indoor and outdoor end frames 38 and 68, and the indoor and outdoor housings 32 and 62 from being out of lace in the direction perpendicular to the axis and also in the rotational direction.

The closely coupling springs 37*a*, 37*b*, 67*a* and 67*b*, which connect the indoor handle connection member 34 and the indoor slide cylinder 36, and the outdoor handle connection member 64 and the outdoor slide cylinder 66, are constructed to be snapped in spring-snapping hooks 34*w*, 64*w*, 36*w* and 66*w* formed in the indoor handle connection member 34 and the indoor slide cylinder 36, and the outdoor handle connection member 64 and the outdoor slide cylinder 66, respectively.

The cap 93 is snapped in an oblong hole 64*z* formed in the handle connection 64*a* of the indoor handle connection member 64 by means of a uni-directional snap piece 93*w* formed in the circumference of the cap 93.

Inner tube-shaped supports 32*a* and 62*a* formed in the indoor and outdoor housings 32 and 62 for supporting the outer tube-shaped supports 34*b* and 64*b* formed in the indoor and outdoor handle connection members 34 and 64 have at least two ring-shaped support projections for the purpose of support with minimum friction. The shape of the support projections are not specifically limited to the ring shape and may be the integrally formed spherical shape.

The unlocking button 61 is adapted to operate with the unlocking pin 95 inserted thereinto and may be designed to further have a unit which is capable of being operated with a key in order to release the door lock.

The operating piece 130 has an oblong slide groove 130*g* being open on the one side thereof so as to be in communication with the door lock unit 120.

There are further provided slits 36*y* and 66*y* in the end portions of the indoor and outdoor slide cylinders 36 and 66 for the indoor and outdoor rotary pieces 39 and 69 to be inserted thereinto, and slide members 36*m* and 66*m* which are inferior in wear-resistance to the indoor and outdoor rotary pieces 39 and 69 are formed inside these slits 36*y* and 66*y* for the purpose of prolonging the lives of the indoor and outdoor rotatory pieces 39 and 69.

Pin holes 39*v* and 69*v* for the first and second pins 80 and 82 to be inserted thereinto are formed in the indoor and outdoor rotary pieces 39 and 69, respectively.

The indoor and outdoor end frames 38 and 68 have the flanges 38*p* and 68*p* formed on the one end of disk-shaped bodies 38*d* and 68*d*, with oblong slide holes 38*j* and 68*j* formed in the center of the bodies 38*d* and 68*d*, so that the door lock bar 92 slides through the oblong slide holes 38*j* and 68*j*. The bodies 38*d* and 68*d* have oblong space portions 38*q* and 68*q* for reception of the indoor and outdoor rotary pieces 39 and 69, respectively, and further have pin-fixing holes 38*u* and 68*u* for fixing both ends of the first and second pins 80 and 82 which are inserted into the pin holes 39*v* and 69*v* formed in the indoor and outdoor rotary pieces 39 and 69 across the space portions 38*q* and 68*q*.

Hereinafter, the functions according to the present invention will be described in more detail with reference to the attached drawings as follows.

First, as illustrated in FIG. 4, when the indoor handle 30 is turned in a first direction, the indoor handle connection member 34 is turned in conjunction with the indoor handle 30 in such a manner that the driving cams 34*c* and 64*c* formed in the cross-section of the indoor handle connection member 34 form odd angles with the driven cams 36*c* and 66*c* formed in the cross-section of the indoor slide cylinder 36, as shown in FIGS. 3 and 11, and that the indoor slide cylinder 36 is guided by the rectilinear guide fitting 200 and slides in the E direction as directed by the arrow in FIG. 11 so as to press the the indoor rotary pieces 39 in the P direction as directed by the arrow in FIG. 7.

On the other hand, when the indoor handle 30 is operated in the back and forth motion as shown in FIG. 5, or in the twisting motion as in FIG. 6, the indoor handle connection member 34 turns around the coner C1 of the outer tube-shaped support 34*b* which is formed in the indoor handle connection member 34, so that the driving cam 34*c* forms axial step difference S10 and the indoor slide cylinder 36 abutting on the driving cams 34*c* and 64*c* is slidingly pressed by the rectilinear guide fitting 200 in the H direction as directed by the arrow in FIG. 12.

In this process, the pre-pressing spring 400 strained between the indoor slide cylinder 36 and the indoor end frame 38 permits the indoor slide cylinder 36 to be rotated in close contact with the inner tube-shaped support 32*a* of the indoor housing 32.

As described above, the indoor slide cylinder 36 experiences only rectilinear motion always in a constant direction by the rectilinear guide fitting 200 even though the indoor handle 30 is brought in the rotational, back and forth sliding or twisting motion from any direction. This guiding by the rectilinear guide fitting 200 is enabled as the guide groove 36*g* formed in the indoor slide cylinder 36 is guided by the guide rib 38*b* formed in the indoor end frame 38.

In the meanwhile, the indoor rotary piece 39 is turned in the K direction as indicated by the arrow in FIG. 7 around the first pin 80 by means of the axially sliding indoor slide cylinder 36, thereby pressing the operating piece 130 in the L direction in FIG. 7, so that the operating piece 130 is guided by the guide frame 300 and imposes a compressing force upon the door lock spring 132 to draw the door lock unit 120 in the M direction as indicated by the arrow in FIG. 7, thereby unlocking the door 100.

If the external force in this condition is removed from the indoor handle 30, that is, the user takes his hands off the indoor handle 30, the indoor handle 30 is restored to the original position by the restoring force of the closely coupling springs 37*a* and 37*b* coupling the indoor handle connection member 34 and the indoor slide cylinder 36, and the door lock unit 120 with the indoor rotary piece 39 is pressed in the reverse direction by the restoring force of the door lock spring 132 which has been compressed by the operating piece 130, thereby locking the door 100.

The outdoor handle 60 may be operated in a similar way to the indoor handle 30 as described above, which is because the construction for the outdoor handle 60 is the same with that for the indoor handle 30.

On the other hand, when the door lock button 31 is pressed in the room in the W direction as indicated by the arrow in FIG. 8, the door lock bar 92 and the unlocking button 61 are pressed simultaneously in the same direction with the door lock button 31, thereby compressing the return spring 94 positioned between the unlocking button 61 and the cap 93 and permitting the locking snap-in flange 92*a* formed in the door lock bar 92 to be fit in the snap-in groove 69*g*. Accordingly, the outdoor rotary piece 69 is forced to be locked.

The snap-in spring 90 installed in the door lock button 31 in this case is snapped in the snap-in hole 34*h* of the handle connection 34*a* formed in the indoor handle connection member 34, retaining the door locked. That is, the elastic force of the snap-in spring 90 is more or less larger than that of the return spring 94 which is located between the unlocking button 61 and the cap 93 for keeping the door 100 locked.

Furthermore, the conformity of the snap-in spring 90 with the snap-in hole 34*h* is achieved by the rectilinear guide for the door lock button 31 by the guide flange 31*k* formed in the circumference of the door lock button 31 and by the guide grooves 34*r* and 34*s* formed in the handle connection 34*a* of the indoor handle connection member 34.

Even when the outdoor handle 60 is forced to unlock the door 100 in this case, the outdoor rotary piece 69 is fastened by the locking snap-in flange 92*a* of the door lock bar 92 so that the door 100 cannot be unlocked by means of the outdoor handle 60 in the outside of the room. On the contrary, when the indoor handle 30 is operated to unlock the door 100 inside of the room with the force imposed upon the indoor rotary piece 39 in the Q direction as indicated by the arrow in FIG. 9, the operating piece 130 is moved in the T direction in FIG. 9 and the unlocking cramp 39*b* formed in the indoor rotatory piece 39 presses the unlocking snap-in flange 92*b* formed in the door lock bar 92 in the U direction as indicated by the arrow in FIG. 9. Simultaneously, the door lock bar 92 is slidingly pressed in the Z direction in FIG. 9 together with the door lock button 31 while the locking snap-in flange 92*a* formed in the door lock bar 92 becomes released from the snap-in groove 69*g* formed in the outdoor rotatory piece 69, thereby unlocking the door 100.

The unlocking button 61 in this case is moved in the same direction with the door lock bar 92 by the elastic restoring force of the return spring 94.

Unlike the mechanism as described above, when the unlocking button 61 is pressed in the S direction as indicated by the arrow in FIG. 9 with the unlocking pin 95 being inserted into the central hole 93*h* formed in the cap 93 in the outside of the room, the door lock bar 92 is pressed by the unlocking button 61 in the Z direction as indicated by the arrow in FIG. 9, thereby releasing the locking snap-in flange 92*a* from the snap-in groove 69*g* formed in the outdoor rotary piece 69.

Such as in the present invention as described above, the door lock device has a construction that the indoor and outdoor handles can be operated in any motion such as turning, twisting or back and forth sliding motion, and accordingly, it can be operated accurately with the convenience not only for normal persons but also for persons who have difficulty in moving their bodies or have a disability of the body, such as the old and the weak including children, pregnant women, physically handicapped persons and patients.

What is claimed is:

1. In a door lock device which comprises an indoor handle and an outdoor handle which are installed inside and outside a room, respectively, a door lock button positioned on the indoor handle for switching a locking state of a door; an unlocking button positioned on the outdoor handle for releasing the locking state of the door lock button, and a door lock unit located on the door for being snapped in a snap piece which is disposed on a door frame, said door lock device comprising:

an indoor housing and an outdoor housing each having inner tube-shaped supports;

an indoor handle connection member and an outdoor handle connection member each having handle connections provided on a first end thereof in communication with the indoor and outdoor handles through the indoor and outdoor housings, respectively, and driving cams provided on a second end thereof formed with a cam curvature having step differences in an axial direction;

an indoor slide cylinder and an outdoor slide cylinder each having driven cams provided on a first end thereof in contact with the driving cams, and experiencing a rectilinear motion in the axial direction by means of an axial step difference formed according to movement of the indoor and outdoor handle connection members;

a first closely coupling spring having a first end fixed to the indoor handle connection member, and a second end fixed to the indoor slide cylinder;

a second closely coupling spring having a first end fixed to the outdoor handle connection member, and a second end fixed to the outdoor slide cylinder;

an indoor end frame and an outdoor end frame for allowing the indoor and outdoor slide cylinders, respectively, to be guided rectilinearly in the axial direction by means of a rectilinear guide fitting, and simultaneously being in communication with the indoor and outdoor housings, respectively;

a guide frame located between the indoor and outdoor end frames and having an operating piece supported by a door lock spring, wherein the operating piece is connected to the door lock unit; and an indoor rotary piece and an outdoor rotary piece positioned to experience a rotational motion with the indoor and outdoor end frames by means of first and second pins, respectively, and having a sliding rotational motion by means of the indoor and outdoor slide cylinders for transferring the motion thereof to the operating piece.

2. The door lock device as defined in claim 1, further comprising:

a snap spring provided on the door lock button inserted into the indoor handle connection member through the indoor handle, snapped in a snap-in hole formed on the indoor handle connection member while the door is locked, and released from the snap-in hole during unlocking the door;

a door lock bar experiencing a sliding motion in the axial direction by means of the door lock button, and having both locking and unlocking snap-in flanges;

an unlocking button for compressing a return spring built inside a cap installed on the outdoor handle connection member while said unlocking button is pressed by the door lock bar, and being pressed by an unlocking pin inserted thereinto through a central hole formed in the cap in such a manner that the locking flange formed on the door lock bar is released from a snap-in groove formed in the outdoor rotary piece; and an unlocking clamp formed in the indoor rotary piece, and hooked in the unlocking flange formed in the door lock bar by means of the rotational motion of the indoor rotary piece in such a manner that the door lock bar is slidingly pressed to unlock the door.

3. The door lock device as defined in claim 1, further comprising pre-pressing springs installed between the indoor slide cylinder and the indoor end frame and between the outdoor slide cylinder and the outdoor end frame, respectively, thereby imposing elastic force upon the indoor slide cylinder, the indoor end frame, the outdoor slide cylinder and the outdoor end frame by means of the inner tube-shaped supports formed in the indoor and outdoor housings.

4. The door lock device as defined in claim 1, wherein the rectilinear guide fitting comprises:

guide grooves formed in end portions of the indoor and outdoor slide cylinders, respectively; and guide ribs formed in the indoor and outdoor end frames and being inserted into the guide grooves.

5. The door lock device as defined in claim 1, wherein the driving cams and the driven cams are shaped in a form of a sine wave.

* * * * *